United States Patent
Prestidge et al.

(10) Patent No.: US 7,792,654 B2
(45) Date of Patent: Sep. 7, 2010

(54) DIMENSIONAL MEASUREMENT PROBE

(75) Inventors: Tim Prestidge, Somerset (GB); Jonathan Paul Fuge, South Gloucestershire (GB)

(73) Assignee: Renishaw PLC, Wotton-under-Edge (GB)

( * ) Notice: Subject to any disclaimer, the term of this patent is extended or adjusted under 35 U.S.C. 154(b) by 220 days.

(21) Appl. No.: 11/919,000

(22) PCT Filed: May 8, 2006

(86) PCT No.: PCT/GB2006/001654

§ 371 (c)(1),
(2), (4) Date: Oct. 23, 2007

(87) PCT Pub. No.: WO2006/120403

PCT Pub. Date: Nov. 16, 2006

(65) Prior Publication Data

US 2009/0043534 A1    Feb. 12, 2009

(30) Foreign Application Priority Data

May 10, 2005   (GB) ................ 0509394.3

(51) Int. Cl.
*G01B 5/012* (2006.01)
(52) U.S. Cl. .......................................... 702/95
(58) Field of Classification Search ............. 702/95
See application file for complete search history.

(56) References Cited

U.S. PATENT DOCUMENTS

2004/0061498 A1* 4/2004 Ochi et al. ................. 324/318
2005/0024051 A1* 2/2005 Doddrell et al. ............ 324/307

FOREIGN PATENT DOCUMENTS

| EP | 0 243 766 A2 | 11/1987 |
| EP | 0 445 945 A1 | 9/1991 |
| WO | WO 85/04706 | 10/1985 |
| WO | WO 2006/100508 A1 | 9/2006 |

OTHER PUBLICATIONS

Borovsky and Krim, Measuring nanomechanical properties of a dynamic contact using an indenter probe and quartz crystal microbalance, 2001, American Institute of Physics.*

* cited by examiner

*Primary Examiner*—Tung S Lau
(74) *Attorney, Agent, or Firm*—Oliff & Berridge, PLC

(57) ABSTRACT

A probe for measuring the dimensions of objects on a coordinate positioning machine such as a machine tool has a workpiece-contacting stylus 20. This is suspended via a sensor mechanism 30, including strain gauges 34 which provide an output when the stylus contacts a workpiece. A processor 16 processes the strain gauge outputs to produce a trigger signal. It does so in accordance with an algorithm or equation or look-up table which ensures equal sensitivity in all possible directions of approach to the workpiece in the three dimensions X, Y, Z.

11 Claims, 4 Drawing Sheets

DIMENSIONAL MEASUREMENT PROBE

The present invention relates to a probe, for measuring the dimensions of objects, of the type used in conjunction with a machine which has coordinate positioning such as a coordinate measurement machine, machine tool, robotic device, or the like.

Traditionally one type of dimensional measurement probe produces a trigger signal when a contact stylus touches an object, the trigger signal causing a recording of the coordinates of the coordinate positioning machine to which the probe is attached. Sensors in the probe detect minute loadings on the stylus as the probe moves closer to the object in order to detect contact between the stylus and the object. For practical reasons the contact stylus is usually an elongate stem with an enlarged end so that it can reach features of the object to be dimensionally measured.

The stem of the stylus is not completely stiff because it is relatively slender so as to reach as many features of the object as possible. Therefore, the stylus stem will bend slightly when subjected to side loading resulting from object contact perpendicular or oblique to the axis stem, but it will not bend significantly when subjected to loading caused by contact in a direction substantially along the axis of the stem. Bending of the stylus support structure occurs also. Again the bending is greater when the stylus is loaded from the side when compared to its bending resulting from loads along the axis of the stylus.

The result of this bending causes a trigger signal which is dependent on the relative positions of the object surface and the axis of the stylus stem. In other words an object may appear to be a different size depending on the inclination of the stylus stem relative to the object's surface, caused predominantly by stylus bending and to a lesser extent by bending of the stylus support structure.

One way to overcome this problem is to calibrate the probe so that for example correction factors are applied to the coordinate values when the probe is caused to trigger due to a side loading and different correction factors are applied when the probe is triggered by an "on-axis" contact. Such a calibration requires time and a calibration artifact. It is not always possible to apply a correction factor particularly if it is not known in which direction the contact force is being applied to the stylus.

Another way to overcome stylus bending is to make very sensitive the sensors which detect displacement of the stylus. Hence, little bending of the stylus takes place before a trigger is issued. This has the disadvantage that the probe may produce false trigger signals resulting from vibration of the machine or rapid acceleration or retardation of the probe. To overcome false triggers less sensitive sensors have to be used, although this produces a slight lag between initial contact of the object by the stylus and the trigger signal being issued. This happens because there is insufficient force on the stylus initially to produce a trigger signal. Further relative movement between the stylus (and probe) and the object is required. This further relative movement is called "pretravel" and is associated with the bending of the stylus stem and the probe mechanism mentioned above.

The stylus can be arranged such that its bending due to side loading is the same as the displacement along the axis of the stylus stem, e.g. a resilient member positioned along the stem to imitate the side deflection of the stylus stem. This mechanical solution causes problems e.g. vibration of the stylus and relative manufacturing complexity.

A new approach has been provided by the inventors:
a measurement probe for dimensional measurement of an object by means of contact of the object in at least two different approach directions, comprising:
a stylus having an object contact area and having a stem extending substantially along an axis;
a stylus contact determination device having a plurality of sensor elements each having an output for detecting contact of the object by the object contacting area of the stylus; and
a processor for processing the output of the sensor elements, wherein the processor processes an output of at least two of the sensor elements to provide an object contact trigger signal caused by a predefined displacement of the stylus object contact area, which displacement is substantially the same in each of said approach directions.

Thus in embodiments of the invention it may be that the contact trigger signal has issued as a result of object contact similar to that shown in FIG. 2 or 3 and in either event the trigger signal will issue only when the stylus contact area is displaced in its triggering direction by an amount (z in FIG. 2 or x in FIG. 3) which is equal, despite some of that displacement (d) being caused by stylus stem bending. So, the position of the stylus when a trigger signal is issued is not dependent on the direction in which contact is made, but instead will issue when the stylus tip or object contact area has been displaced in any direction by a predetermined amount which is the same in all directions of displacement.

Preferably the outputs are combined at the processor.
Preferably the outputs from the sensor elements are combined at the processor according to an algorithm or equation. Preferably the algorithm or equation is $$G = \frac{1}{\alpha}\{\Delta R_1^2 + \Delta R_2^2 + \Delta R_3^2 + \beta(\Delta R_1 \Delta R_2 + \Delta R_2 \Delta R_3 + \Delta R_3 \Delta R_1)\}$$

where the terms $\Delta R_1$, $\Delta R_2$ and $\Delta R_3$ refer to the outputs of the sensor elements.

Alternatively the outputs from the sensors are processed at the processor so as to be compared with predetermined data.

Preferably the probe includes a probe body and preferably the processor is disposed within the probe body.

Embodiments of the invention will now be described in detail in the following paragraphs with reference to the accompanying drawings, in which:

FIGS. 1a and 1b are schematic diagrams showing a measurement probe according to the invention, FIG. 1b being a section on the line 1b-1b in FIG. 1a;

Figure 1A:
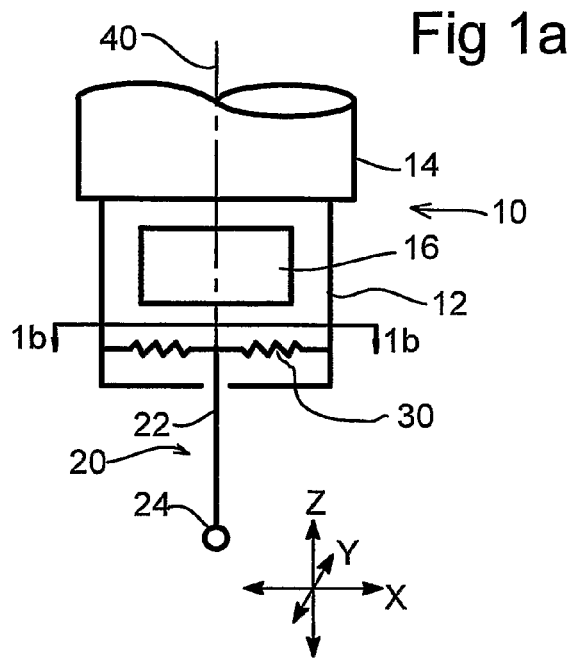

In FIG. 1a a measurement probe 10 is shown which has a body 12 attached to the spindle of a machine tool 14. The probe has a stylus 20 having a stylus tip 24 for contacting an object, in this case a workpiece 50 (FIGS. 2 and 3), and an elongate stem 22 extending along axis 40. The stem 22 is connected to the body 12 by means of a strain sensing sensor 30. The sensor 30 is shown in plan in FIG. 1b. Three fairly rigid spokes 32 each have a strain gauge 34 attached thereto for sensing strain in each spoke, e.g. when contact is made between the workpiece 50 and stylus tip 24. A processor 16 is connected to receive the outputs of each strain gauge.

Figure 6:
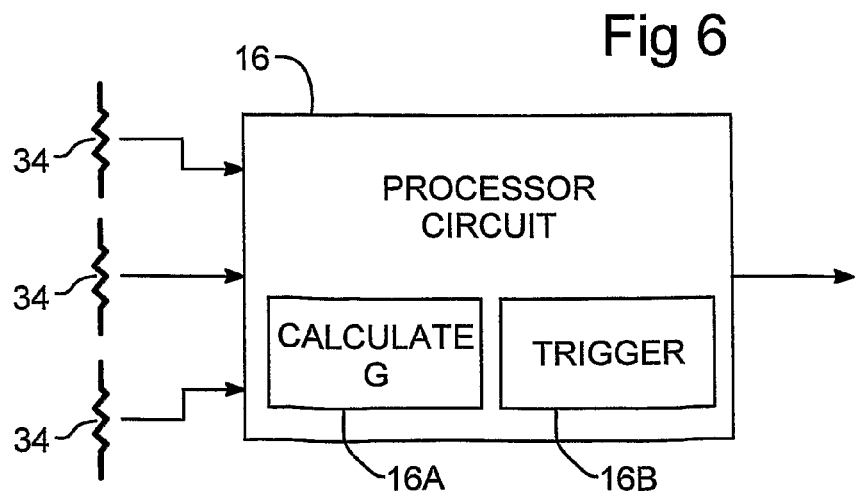
FIG. 6 is a schematic circuit diagram of a processor of the probe.

In use the probe 10 is moved relative to the workpiece 50 in directions X, Y and Z. Various contacts between the stylus tip 24 and the workpiece 50 are made in order to determine the size of the workpiece 50. When a contact is made strain is exerted on the sensors 34. The outputs of the strain gauges 34 are in the form of resistance change, and are processed by the processor 16 in the manner discussed below and shown in FIG. 6, to produce a trigger output signal. The trigger signal issued from the processor 16 can be used to record the machine tool's position in order to determine the size of the workpiece 50.

Figure 1B:
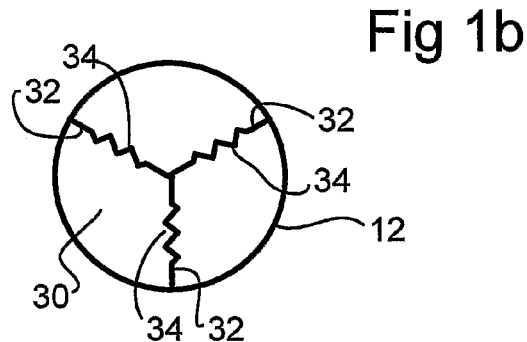
Figure 2:
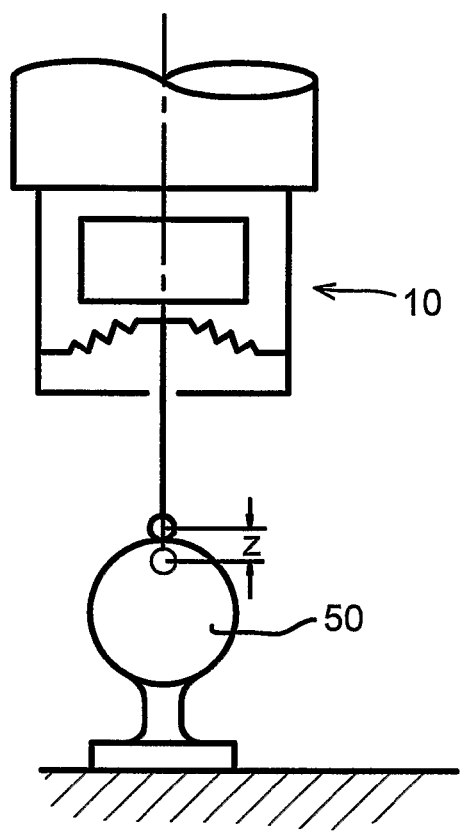
FIGS. 2 and 3 show the measurement probe of FIG. 1 in use.

FIG. 2 shows the probe of FIGS. 1a and 1b and workpiece 50. In FIG. 2 the stylus 20 has been displaced longitudinally by an amount z before a trigger signal is issued by processor 16. A force will be required to impart strain into the strain gauges 34 and thus cause the trigger signal.

Figure 3:
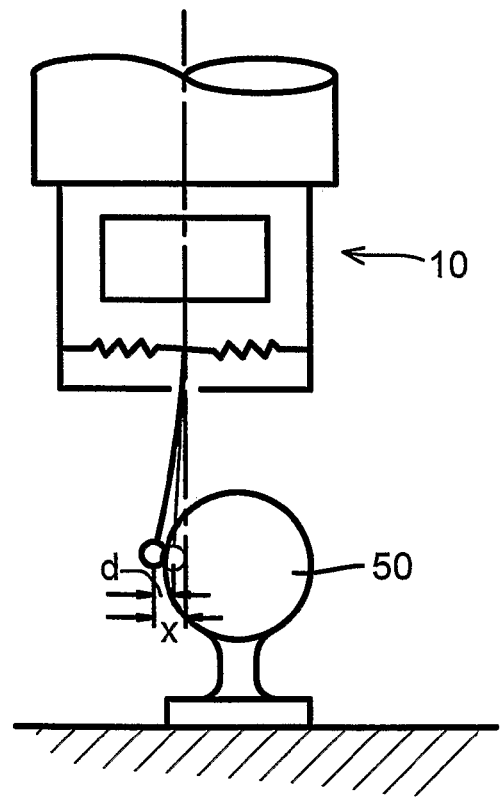

FIG. 3 shows also the probe of FIGS. 1a and 1b and workpiece 50. In FIG. 3 the stylus 20 has been deflected laterally by distance x in order to produce a trigger signal.

The force required to produce the trigger signal when contact is at the side of the tip (as in FIG. 3) will cause the stylus to bend. Conventionally, z<x because the stylus is much stiffer in the longitudinal direction than laterally. If z<x then the apparent measured size of workpiece 50 will be different in the X (and Y) directions than the apparent measured size in the Z direction.

However, in this embodiment the trigger signal is produced when z is approximately equal to x. This is achieved by combining the outputs from the three strain gauges in the processor 16, to form a gauge output G as follows:

$$G = \frac{1}{\alpha}\{\Delta R_1^2 + \Delta R_2^2 + \Delta R_3^2 + \beta(\Delta R_1 \Delta R_2 + \Delta R_2 \Delta R_3 + \Delta R_3 \Delta R_1)\}$$

where $\alpha$ is a normalisation/scaling factor;

the terms $\Delta R_1$, $\Delta R_2$ and $\Delta R_3$ refer to the change in resistance of the three strain gauges 34; and $\beta$ is a further factor dependent on the strain characteristics of the structure of the sensor 30 and the stylus 20 strain characteristics.

The principle behind the equation above is that the output of each of the gauges may be decomposed into a component arising purely from the component of the contact force acting along the axis 40, and a component arising purely from the component of the contact force acting perpendicular to the axis. These components of the gauge output may then be combined and manipulated to give different sensitivities in X and Y directions compared with the sensitivity in the Z direction. The result of this manipulation is that the object detection caused by contact in the Z direction (as shown in FIG. 2) can be desensitised so that more contact force is required to produce a trigger signal than the force required to produce a trigger signal when the contact is of the type shown in FIG. 3. Thus the distance z and x can be made equal or substantially or approximately equal, despite the x deflection having a component (d) resulting from bending of the stylus stem 22. The same but relative effect also occurs for all intermediate directions between x and z. This makes the contact signal trigger output independent of the direction of contact. A pre-defined movement of the stylus tip in any direction relative to the stylus thus produces a trigger signal output.

The processor 16 preferably comprises a combination of analogue circuitry. This is configured in a known manner with a module 16A which calculates G in real time in accordance with the above equation. It also comprises a module 16B which is configured to produce the trigger output when the value of G exceeds a predetermined threshold value. This circuitry of the processor 16 may be implemented as an application-specific integrated circuit (ASIC).

Alternatively, however, the processor 16 can be implemented in a digital form, with a suitably programmed digital arithmetic unit. The outputs of the strain gauges can be converted to digital signals using analogue-to-digital converters. The processor 16 can include program modules corresponding to the modules 16A, 16B. The equation presented above can be maintained in non-volatile memory in the processor 16, which can then constantly monitor and process the strain gauge outputs.

Alternatively the processor 16 can compare the gauge outputs with a data table, in real time. A trigger signal output will be produced if the comparison indicates that the outputs of the strain gauges are indicating a triggered condition. In practice this can be achieved by using for example an analogue to digital converter for each strain gauge, the outputs of which form an address bus connected to the data table memory. An output from the memory of "0" (no trigger) or "1" (trigger) can be used.

The values of $\alpha$ and $\beta$ are normally held constant during a given measurement. However, small variations may be applied to them, e.g. to offer lower vibration sensitivity, or used to detect the probing direction (Z versus X, Y). Changes in stylus length can be accommodated by changing the value of $\beta$ or if a data table is used, having different tables for different styli. The data for the table can be pre-programmed or "taught" by exercising the stylus and teaching the probe to trigger at certain deflections. Gaps in data can then be infilled using a mesh algorithm. The processor 16 may be located away from the probe e.g. in an interface between the probe and the machine to which it is attached.

The equation presented above assumes the gauges 34 are symmetric about the axis Z, but with modification a similar equation can be used for other configurations of sensor 30, having two or more sensing elements.

The sensor 30 is shown having strain gauges extending radially of axis Z. However, the sensor need not use strain gauges and the sensing elements need not extend radially. For example the sensing elements could be displacement sensors like LVDTs, linear encoders or capacitance sensors. Their arrangement could be axial or any position which allows sensing of stylus contact.

Figure 4:
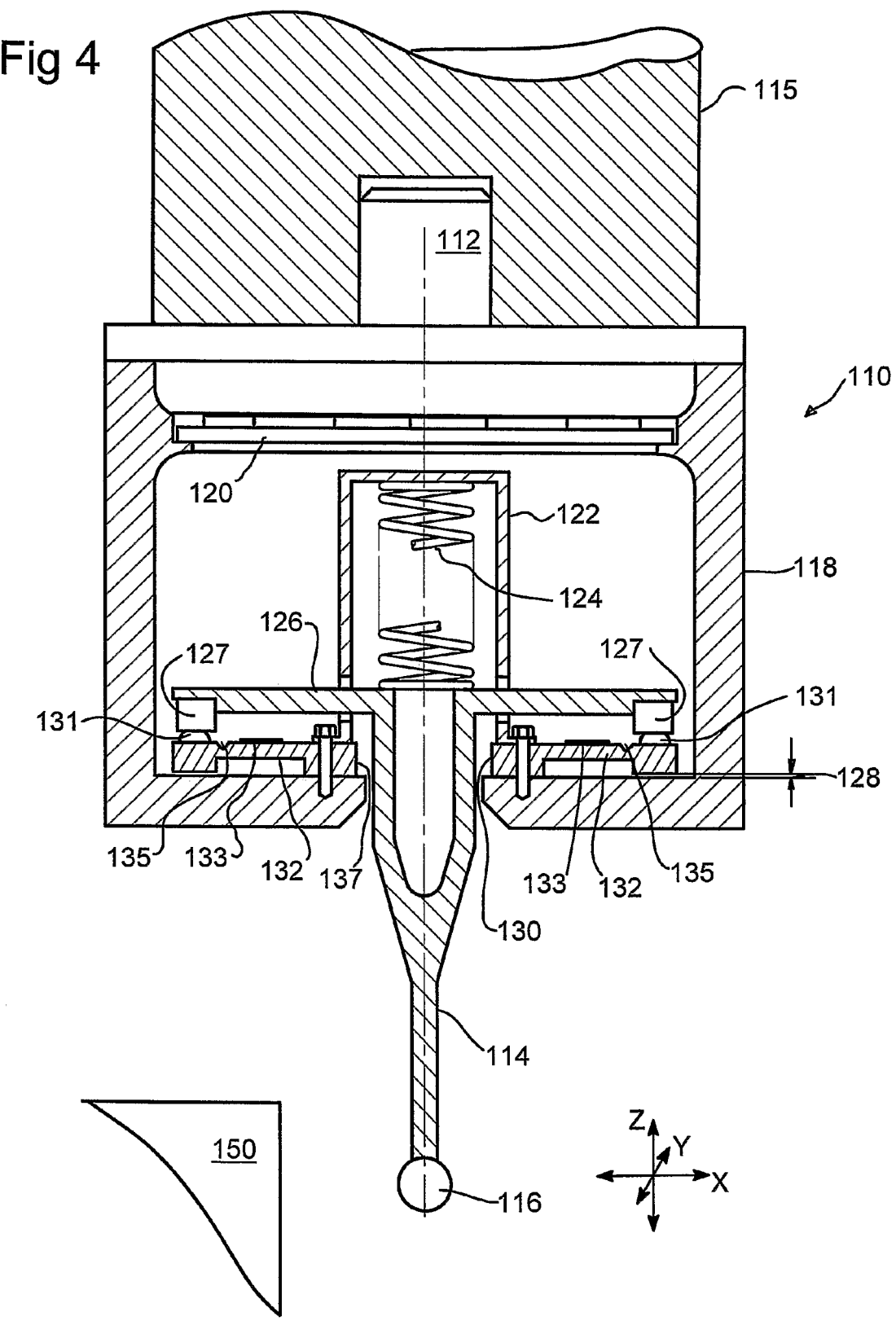
FIGS. 4 and 5 are views corresponding to FIGS. 1a and 1b, but showing a practical example of a measurement probe.
Figure 5:
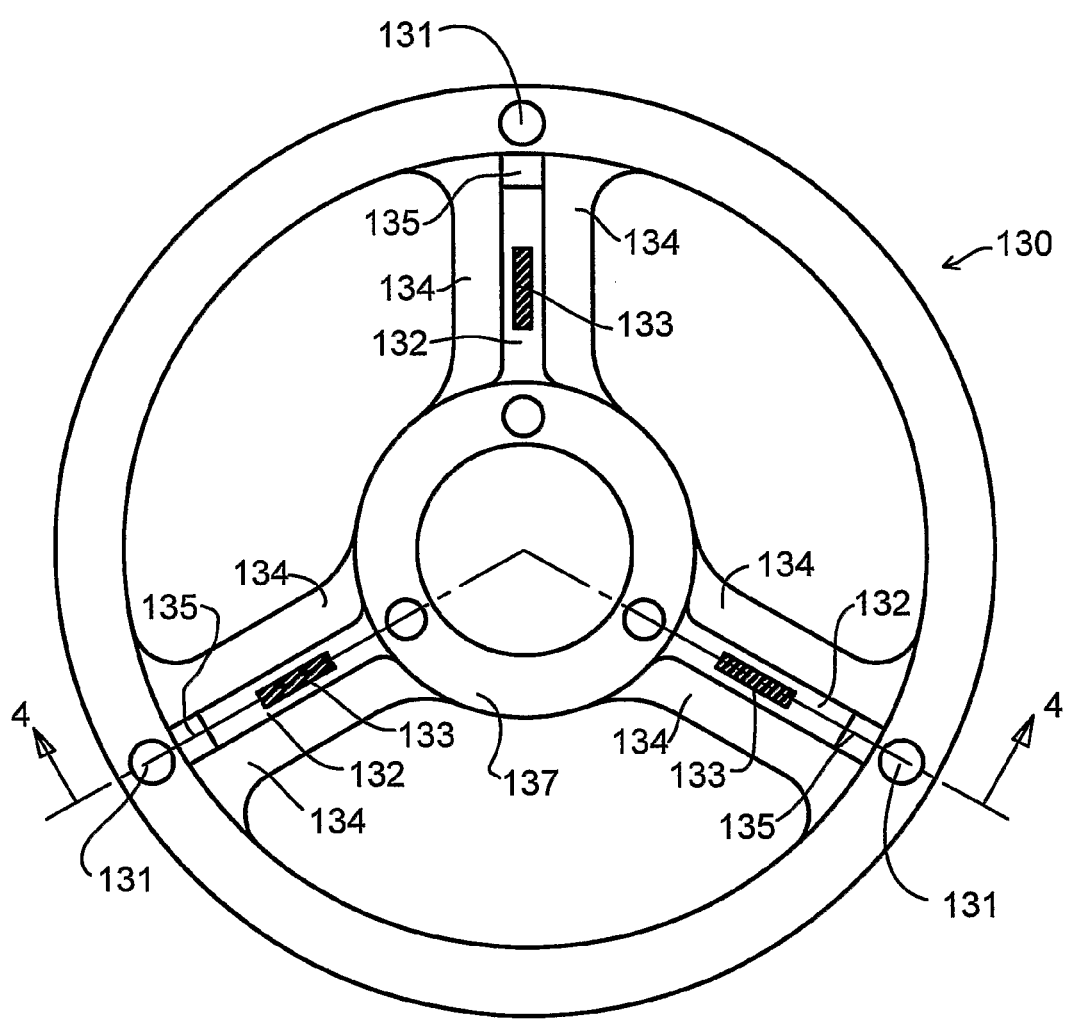

The mechanical arrangement of a practical probe is shown in FIGS. 4 and 5, by way of example. It will be appreciated that other arrangements are possible. For clarity the view of the probe in FIG. 4 is a part-section in the sectional plane denoted 4-4 in FIG. 5. This plane is not completely flat but includes two planes at 120° to each other.

A dimensional measurement probe 110 is shown which is attachable to a machine 115 via a boss 112. The machine is typically one which can determine the coordinates of the probe e.g. in xy and z planes.

The probe has a stylus 114 including a tip 116 for contact with a workpiece or other artifact 150 to be measured. The probe is moved by the machine relative to the artifact 150 and contact of the stylus tip with the artifact 150 is sensed by the mechanism within the probe 110. The probe produces a trigger signal which is sent to the machine in order to determine the probe's coordinates. In this way the coordinates of the surface of the artifact can be obtained.

The probe 110 includes a main body 118, a circuit board 120, a spring cage 122, a compression spring 124, upper member 126 of stylus 114 and a strain sensing element 130. The circuit board 120 contains the processor 16 discussed above in connection with FIGS. 1-3 and FIG. 6. Other arrangements are of course possible, e.g. a flexible circuit board may be wrapped cylindrically around the mechanical components of the probe.

In operation force is exerted on the stylus tip in the x, y or z directions or combinations of these directions. The force causes flexing of the radially extending arms 132 of the sensor element 130 relative to the body 118 to which the sensor element is fixed at central portion 137. Excessive force on the stylus in the x or y directions, or pulling the stylus in the z direction away from the probe body, will result in closing of the gap 128 between the sensor element 130 and the body 118. Thus excessive strain on the sensor element 130 cannot take place. Further force on the stylus causes the compression of spring 124 resulting in the disconnection between the stylus upper member or stylus holder 126 and the sensor element 130 against the force of the compression spring 124. Removal of the further excessive force allows the stylus to reseat against the sensor element 130. The contact between this upper member 126 and the sensor element 130 is in the form of a kinematic location having a total of six points of contact. In this instance the kinematic location is formed from three balls 131 on the sensor, each one nesting between a pair of rollers 127 on the member 126. Thus advantageously, reseating is possible into a repeatable rest position if excessive force is exerted on the stylus. However, a non-kinematic location is also possible.

FIG. 5 shows the sensor element 130 in more detail. The element 130 is produced as one piece, e.g. of machined metal. Each of the three balls 131 affixed to the surface of the element 130 has in use force exerted on them. When the stylus tip 116 contacts the workpiece the force exerted on the balls is altered. This in turn causes strain to be induced in radial arms 132. A semiconductor strain gauge 133 is secured to each of the arms 132. Each strain gauge provides a change in output if the strain in the arm is altered. Thus stylus contact with article 150 can be detected.

Three radially extending arms 132 are shown, although other numbers of arms may be employed. Further or alternative details of the probe may be as shown in International Patent Application No. PCT/GB2006/001095, which is incorporated herein by reference.

The invention claimed is:

1. A measurement probe for dimensional measurement of an object, comprising:
   a stylus having an object contacting area and having a stem extending along a first axis;
   a stylus contact determination device having a plurality of sensor elements, each sensor element having an output for detecting physical contact of the object by the object contacting area of the stylus; and
   a processor for processing the outputs of the sensor elements;
   wherein the outputs of the sensor elements are combined in the processor such that the sensitivity when an object is approached along an approach direction parallel to the first axis is different compared with the sensitivity when an object is approached along an approach direction perpendicular to the first axis, whereby the processor provides an object contact trigger signal caused by a predefined displacement of the stylus object contacting area, the predefined displacement being approximately independent of the approach direction between the measurement probe and the object, and the processor combines the outputs of the sensor elements to form a gauge output (G) according to the algorithm or equation $$G = \frac{1}{\alpha}\{\Delta R_1^2 + \Delta R_2^2 + \Delta R_3^2 + \beta(\Delta R_1 \Delta R_2 + \Delta R_2 \Delta R_3 + \Delta R_3 \Delta R_1)\}$$

where the terms $\Delta R_1$, $\Delta R_2$ and $\Delta R_3$ refer to the outputs of the sensor elements and $\alpha$ and $\beta$ are scaling factors.

2. A measurement probe according to claim 1, wherein the processor compares the outputs of the sensors with predetermined data in a look-up table.

3. A measurement probe according to claim 1, wherein each sensor element comprises a strain gauge.

4. A measurement probe according to claim 1 comprising a probe body, wherein the processor is disposed within the probe body.

5. A measurement probe according to claim 1, wherein the stylus contact determination device comprises three sensor elements.

6. A measurement probe according to claim 1, wherein the sensor elements are symmetric about the first axis.

7. A measurement probe according to claim 1, wherein the sensor elements extend radially about the first axis.

8. A measurement probe according to claim 1, wherein the processor comprises analogue circuitry.

9. A measurement probe according to claim 1, wherein the processor comprises a digital unit.

10. A measurement probe according to claim 1, wherein the stylus is stiffer in a longitudinal direction along the first axis than in a lateral direction.

11. A measurement probe according to claim 1, wherein the stylus can bend in a direction perpendicular to the first axis.

* * * * *